United States Patent [19]

The et al.

[11] Patent Number: 5,118,484
[45] Date of Patent: Jun. 2, 1992

[54] DESILICATION OF BAYER PROCESS SOLUTIONS

[75] Inventors: Kwat I. The, Jonquiere; George D. Fulford, Kingston, both of Canada

[73] Assignee: Alcan International Limited, Montreal, Canada

[21] Appl. No.: 568,989

[22] Filed: Aug. 17, 1990

[51] Int. Cl.⁵ ............................................. C01B 33/12
[52] U.S. Cl. ................................. 423/335; 423/118; 423/119; 423/121; 423/131
[58] Field of Search ............... 423/112, 111, 118, 119, 423/120, 121, 122, 131, 628, 629, 328, 335, 326, 327

[56] References Cited

U.S. PATENT DOCUMENTS

| | | | |
|---|---|---|---|
| 2,519,362 | 8/1950 | Flint et al. | 423/121 |
| 2,939,764 | 6/1960 | Schoenfelder et al. | 423/131 |
| 2,947,606 | 8/1960 | Holderreed et al. | 423/131 |
| 3,574,539 | 4/1971 | Domine et al. | 23/112 |
| 4,256,709 | 3/1981 | Sizyakov | 423/121 |
| 4,426,363 | 1/1984 | Yamanda et al. | 423/121 |
| 4,455,284 | 6/1984 | Sizyakov et al. | 423/119 |
| 4,518,571 | 5/1985 | Kaluzhsky et al. | 423/119 |
| 4,994,244 | 2/1991 | Fulford et al. | 423/121 |

FOREIGN PATENT DOCUMENTS

| | | |
|---|---|---|
| 61-266306 | 12/1986 | Japan. |
| 62-68839 | 3/1987 | Japan. |
| 63-205343 | 8/1988 | Japan. |

OTHER PUBLICATIONS

104:172047c-Raizman, V. L. et al. (USSR) Kompleksn. Ispol'z. Miner. Syr'ya 1986, (2), 52-5 (Russ).
Chemical Engineers' Handbook, 5th Edition, pp. 8-65.

*Primary Examiner*—Theodore Morris
*Assistant Examiner*—Edward Squillante
*Attorney, Agent, or Firm*—Cooper & Dunham

[57] ABSTRACT

A process is described for removing dissolved silica from process solutions or slurries formed in the Bayer process for producing alumina from bauxite. In the novel process, a Bayer process solution or slurry is contacted with porous agglomerates of a material containing Bayer process desilication product and bonded together by a polymer resin which is resistant to chemical degradation by high concentrations of caustic present in Bayer process liquors. The desilication product is essentially complex hydrated sodium aluminum silicates and typical bonding resins are polyvinylchloride or polypropylene.

16 Claims, 4 Drawing Sheets

DESILICATION OF BAYER PROCESS SOLUTIONS

BACKGROUND OF THE INVENTION

This invention relates to a process for removing dissolved silica from Bayer process solutions and agglomerated sodalite containing material for use therein.

In the Bayer process for producing alumina from bauxite, the bauxite containing aluminum trihydroxides or aluminum oxide-hydroxides is contacted with solutions containing caustic soda to dissolve the aluminum hydroxides as sodium aluminate while leaving most of the remaining constituents of the bauxite essentially unattached in solid form. A part or all of the silica content of the bauxite may also dissolve in the caustic soda solution to form a soluble sodium silicate. This reacts relatively slowly with the sodium aluminate in solution to form complex hydrated sodium aluminum silicates, known collectively as "desilication product", and are referred to hereinafter as either "desilication product" or "Bayer process desilication product". Desilication product from the Bayer process comprises one or more of the following compounds: Bayer Sodalite, $3(Na_2O \cdot Al_2O_3 \cdot 2SiO_2 \cdot 2H_2O)Na_2X$, where X can be one of: $CO_3^=$, $2Cl^-$, $SO_4^=$, or $2AlO_2^-$; Cancrinite, $Na_6 \cdot Ca_{1.5}1.5Al_6Si_6O_{24}(CO_3)_{1.6}$; Noselite, $3(Na_2O \cdot Al_2O_3 \cdot 2SiO_2 \cdot 2H_2O)Na_2SO_4$; and Natrodavyne, $3NaAlSiO_4 \cdot Na_2CO_3$. These desilication products are of low solubility in the resulting sodium aluminatecaustic soda solutions and largely precipitate out of solution thereby removing much of the undesirable silica from the solution phase.

After the digestion step for dissolving the aluminum hydroxide from the bauxite, the undissolved part of the bauxite, together with any desilication product that has precipitated at this point, which are known as "red mud", are separated from the solution, usually by filtration or sedimentation or both. The red mud is then disposed of, usually after being washed to recover the soluble valuables from the entrained caustic-aluminate solution. The clear caustic-aluminate solution after separation of the red mud is characterized by an alumina/caustic ratio grater than 0.55, where caustic is expressed in terms of equivalent $Na_2CO_3$, and is commonly known as "pregnant liquor". It is subsequently cooled, diluted, seeded with aluminum trihydroxide crystals (gibbsite) and agitated for a period of time to precipitate a significant fraction of the dissolved alumina as gibbsite. This precipitate is then separated from the resulting spent liquor which is characterized by an alumina/caustic ratio between 0.3 and 0.4, and typically still contains in the order of half of the original dissolved alumina. A part of the separated gibbsite may be recirculated as seed material to the aluminum precipitation operation, while the remainder is washed to recover the soluble valuables from the entrained liquor, and is then suitably calcined to form alumina product of the Bayer process. The spent liquor may be reconcentrated, impurities removed and new caustic soda added as caustic feed to the digestion step.

Key parts of the Bayer process consist of the digestion step and the mud separation step in which the aluminum hydroxide materials of the bauxite are brought into solution in caustic-aluminate solution as soluble sodium aluminate and the remaining insoluble residue (red mud) is separated from the resulting pregnant solution, leaving a clear caustic sodasodium aluminate solution from which purified gibbsite can subsequently be crystallized. The nature of the solubility of the aluminum hydroxide minerals in caustic soda solutions usually requires that the digestion step be carried out at an elevated temperature in order to achieve higher solubilities of the alumina and hence reasonable liquor productivity (weight of alumina produced per volume of liquor circulated), while the precipitation step needs to be carried out at much lower temperatures to minimize the alumina solubility at this point in the process.

Most current Bayer plants make use of a digestion and mud separation module consisting basically of the equipment required to carry out the following sequence of operations:

(1) Preheating the incoming spent caustic aluminate liquor and bauxite passing to the digesters, using as much as possible recuperated heat followed by high-temperature heat from an external source;

(2) Carrying out the digestion while usually providing a residence time sufficient to permit removal of most of the silica dissolved from clay or quartz minerals in the bauxite by precipitation of a complex sodium aluminosilicate desilication product;

(3) Cooling the digested slurry by flashing the slurry at one or more decreasing pressures down to about atmospheric boiling temperature and using the flashed steam recovered for preheating purposes;

(4) At or below atmospheric boiling temperature, separating the red mud residue from the pregnant aluminate liquor, typically by filtration; or by flocculation, sedimentation and polish-filtration of the clear solution.

In most Bayer alumina plants, the major operating costs today in producing alumina are the costs related to bauxite and energy. Both of these costs are influenced by silica content of the bauxite, because silica reacts in the process. The reactive silica consumes caustic soda, so that high reactive silica bauxites are uneconomical to process. Bauxites with too low reactive silica contents may lead to high silica contents in the product alumina as a result of the limited desilication product formed as seed and the consequent high residual silica concentration in the pregnant liquor after digestion. Thus bauxites of a very limited range of reactive silica contents can be treated by the Bayer process, which tends to increase the price of suitable bauxites. A part of the silica in the Bayer liquors that does not precipitate during digestion, precipitates as scale on the heat transfer surfaces decreasing the efficiency of heat recuperation within the Bayer process, and hence increasing energy costs. An addition-al cost is the capital cost of spare equipment (heat exchangers, etc.) needed to allow for the frequent descaling of the heaters. Another important fraction of the dissolved silica is deposited on the alumina product during the precipitation, decreasing the purity of the alumina and its value.

In the past, control of dissolved silica has been effected mainly by means of controlling the temperature and time of the desilication step. In the North American variant of the Bayer process, desilication is commonly carried out concurrently with the digestion step. The temperature is set by alumina dissolution constraints and the only variable left for silica control is time by increasing the time under digestion conditions. This is costly in terms of capital equipment (pressure vessels) required, and in low temperature digests, additional holding time at 130° to 150° C. may lead to significant alumina losses due to reversion of dissolved alumina into solid form as the less soluble boehmite which is lost with the red mud solids. If adequate desilication cannot be achieved in this way, attempts are made to increase the amount of desilication product seed surface area to digestion by predesilicating or, in extreme cases, by adding clay minerals. These operations increase the costs by increasing both alumina and caustic soda losses.

When preliminary dilution of the digested slurry is used after a high caustic digest (European variant), it has been customary to hold the slurry for desilication at about the boiling temperature before separating the red mud. Again, holding time is the main control parameter and holding time again acts adversely as regards alumina losses. Marginal desilication product seed area control is possible by recirculating part of the red mud but at a further increased cost in alumina losses and equipment size.

It is possible to desilicate outside the digesters, in vessels open to the atmosphere. When the desilication takes place after the digestion step, it is known as post desilication. When desilication is carried out before the digestion step, on a slurry of bauxite and spent liquor, it is called predesilication. It is also possible to carry out the desilication of the spent liquor resulting after separation of the alumina product obtained during the precipitation step. The spent liquor is characterized by an alumina to caustic ratio of between 0.3 and 0.4, where the caustic concentration is expressed as equivalent $Na_2CO_3$, and the total caustic concentration is between 200 and 350 g/L. The spent liquor is returned to the digestion step. All three types of desilication can be carried out in vessels open to the atmosphere. Such vessels are much less expensive to construct and to operate than the pressure vessels required for the digestion of bauxite. However, in the known process for pre and post-desilication at atmospheric pressure, the rate of desilication is very slow, because the desilication reaction rate is dependent on the surface area of the desilication product, and the surface area available is very low. In the known variants to the predesilication and post desilication processes, which are carried out in the presence of bauxite or red mud, attempts are made to increase the rate by adding a desilication product to the desilication vessels to increase the surface area. But added material because of its very fine particle size, usually much smaller than 100 microns, cannot be reused or recycled, because it is removed during the subsequent steps of separating red mud from the liquor. It is discarded after one use along with the red mud, making this route for improving desilication impractical.

Bayer sodalite, as described above, is an effective surface upon which to precipitate the desilication product. The problem has been to find a method whereby a large surface area of seed material, such as sodalite, can be introduced and maintained in the desilication vessels and recovered after use.

Domine et al, in U.S. Pat. No. 3,574,539 disclose that mordenite, an aluminosilicate of formula $(Na_2, Ca, K_2)O.Al_2O_3.10SiO_2.6$—$7H_2O$, can be made in an agglomerated form by adding a plasticizer chosen from a number of compounds including polyvinyl alcohol at a concentration between 1 and 10%, and then forming particulates by extrusion or pressing and drying. Upon stoving between 550° and 800° C., very hard particles are obtained. These particles are useful for the separation and desiccation of gases by preferential absorption. However, the polyvinyl alcohol binder is attacked by the strongly caustic solutions present in a Bayer process, making such material unsatisfactory for use in a Bayer process.

Various other desilication procedures are described in unsatisfactory in commercial operations. For instance, Raizman et al disclose in *Komoleksn. Isool'z Miner Syr'ya* 1986, (2) 52-5, that the addition of red mud and nepheline to an aluminate solution containing 400 g/L of $SiO_2$ and autoclaving at 200° C. resulted in the desilication of the solution. Another procedure is that of Khanamirova et al reported in *Kompleksn. Ispol'z Miner Syr'ya* 1980, (2) 52-6, and 1980 (3) 67-71 in which sodium aluminate solutions are desilicated by autoclaving in the presence of $MgSiO_3$. In a method described by Turinskii et al in SU 1034995, dissolved silica is removed through the formation of insoluble hydrogarnet (calcium aluminate silicate hydrate), by addition of lime; since only a small amount of silica is incorporated into the hydrogarnet, the method is expensive in terms of the ratio of lime used and alumina lost to the amount of silica removed. SU 1034995, by Turinskii et al, discloses the use of an active calcium hydroxide in lime milk to achieve the low temperature desilication of Al solutions by the hydrogarnet route. Yet another technique is described by Derdacka-Grzymek in PL 131,922 in which sodium aluminate solutions are desilicated by the addition of lime at 98° C., followed by filtration to remove the precipitated silica impurity.

There still remains a need for an efficient and inexpensive procedure for removing dissolved silica from Bayer process solutions.

SUMMARY OF THE INVENTION

According to the present invention, dissolved silica is removed from a Bayer process solutions and slurries by contact with porous agglomerates of a material initially containing preferably at least 10% Bayer process desilication product, wherein the agglomerates are bonded by a polymer resin which is resistant to chemical degradation by high concentrations of caustic present in Bayer process liquors.

The desilication product containing agglomerates are typically in the form of porous pellets, having a porosity in the range of 40 to 65% and a surface area in the range of 15 to 30 $m^2/g$.

A wide variety of bonding resins are suitable for use in the invention provided they are resistant to attack by solutions of sodium hydroxide at temperatures above ambient. Examples of such bonding polymers include fluorocarbons, e.g. fluoroethylenes such as polytetrafluoroethylene, chlorinated polyethers, vinylidene fluoride, polyesters of dicarboxylic acids and ethylene glycol, e.g. Dacron ® or Terylene ®, polystyrene, divinylbenzene, polysulfones, polyvinylchloride, polypropylene, etc. Polyvinylchloride and polypropylene are particularly desirable as bonding resins, providing pellets which are physically strong and chemically resistant so that they can be recycled for repeated use.

The porous agglomerates or pellets of desilication product are preferably used contained in a column, with the Bayer process solutions and slurries being passed through the column. These agglomerates or pellets of desilication product containing material provide a large surface area upon which is precipitated the desilication product formed by the reaction between the dissolved silica and the alumina and sodium present in the Bayer process solutions, e.g. a Bayer plant spent liquor, pregnant liquor or slurry of spent liquor and bauxite feed to the digester, or slurry of pregnant liquor and red mud exiting from the digester.

The process for removing the dissolved silica from the Bayer process streams can be carried out at several different points in the Bayer process. It can be carried out on clear liquors substantially free of suspended materials, but also on slurries of solids suspended in liquor. These slurries contain between 2 and 10% of finely divided red mud solids, as well as coarser particles called digester sands which can be removed immediately after digestion and prior to any further processing of the slurry. The red mud solids range in size from less than one micron, e.g. for Jamaican bauxite; to 200 microns, e.g. for African bauxite. The desilication of slurries containing desanded red mud by this invention is possible because the agglomerates used in the process are both large enough not to constitute a blockage or hinderance to the passage of the red mud slurry through the column (especially if upward flow of the slurry is used) and at the same time have sufficient porosity to provide a large enough surface area on which the precipitation of the dissolved silica can take place.

In all instances the removal of the dissolved silica consists of contacting the spent or pregnant liquor or slurry of red mud in pregnant liquor with the porous agglomerates, either at atmospheric pressure and a temperature below the boiling point of the liquor; or at an elevated temperature and pressure up to the temperature and pressure of the digestion operation carried out at a temperature above the boiling point of the liquor, in which case the process is carried out in a closed vessel or column at elevated pressure and temperature.

Among the locations in the Bayer process where the invention can be carried out are:

1. on a slurry of red mud in pregnant liquor exiting from the digesters, without prior removal of the red mud, in which the slurry is passed continuously through a pressurized column containing the agglomerates or contacted batchwise with a mass of agglomerates in a pressurized vessel, at the elevated temperature and pressure up to that found in the digesters, i.e. between 150° to 250° or higher;

2. on pregnant liquor from which the red mud has been separated, in which the liquor is passed continuously through a pressurized column containing the agglomerates, or contacted batchwise with a mass of agglomerates in a pressurized vessel at the elevated temperature and pressure up to that existing at the digestion. The red mud removal can be carried out using the device and conditions disclosed by Harrington and Dancose at the 1989 Meeting of the AIME at Las Vegas, and the subject of pending Canadian patent application Number 589,667-1 filed on Jan. 31, 1989, by Chinloy and Fulford; and assigned to Alcan International Limited.

3. on a slurry of red mud in pregnant liquor exiting from the digesters, which have been subjected to a preliminary cooling by flashin, to a temperature at or below the boiling point of the liquor, in which the slurry is passed continuously through the column containing the agglomerates, or contacted batchwise with a mass of agglomerates in a vessel, at a temperature below the boiling point of the liquor, at atmospheric pressure;

4. on a pregnant liquor, prepared by first cooling the slurry leaving the digester to a temperature at or below the boiling point of the liquor, and then separating the suspended red mud from the slurry, by passing the liquor through a column containing the agglomerates, or contacting batchwise the liquor with a mass of agglomerates in a vessel, at the temperature below the boiling point of the liquor, at atmospheric pressure;

5. on a spent liquor cooled to a temperature below the boiling point of the liquor, treated by passing it through a column containing the agglomerates, or contacting it with a mass of agglomerates in a vessel, at a temperature below the boiling point of the liquor at atmospheric pressure.

The agglomeration of desilication product containing material can be carried out in a variety of different ways.

For instance, the desilication product containing material can be dispersed in the binder by any suitable means, e.g. by melting the binder, mixing in the desilication product containing material particles and kneading the mixture, and extruding into small shapes, or granulating it. The resulting material is allowed to solidify, and is then mechanically broken up into irregular shaped pieces of the appropriate size.

Another method is to disperse the desilication product containing material into the binder by dissolving the binder in a suitable solvent, adding the desilication product containing material particles to the solution and dispersing them by vigorous agitation, and then removing the solvent to form a solid product containing uniformly dispersed desilication product containing particles. The solvent may be removed by evaporation (with heating if the solvent is not very volatile), but the preferred method is so-called "solvent drying" in which the polymer solution is contacted with a liquid which is a non-solvent for the polymer but which is miscible with the polymer solvent. The liquid extracts the solvent from the solution and the solid polymer coagulates or precipitates without changing the distribution of desilication product containing particles to any significant extent. This procedure has been disclosed in pending United States patent application Ser. No. 253,150, filed on Oct. 11, 1988, and assigned to Alcan International Ltd.

When the solvent drying technique is employed, shaped agglomerates can be formed in a particularly easy manner. For example, spheres can be produced by dropping droplets of the binder desilication product containing material slurry into a bath of the non-solvent. Elongated thin cylinders (known as "noodles") can be formed by extruding the slurry from an orifice located beneath the surface of the non-solvent. Thin films can be formed by spreading the slurry between two plates and extracting the solvent by placing the plates in a bath of the non-solvent.

The slurry containing the desilication product containing material is divided into droplets of equal size which are then introduced into a non-solvent bath. The droplet formation can be carried out, for example, by feeding the slurry through a hollow tube (e.g. 1-3 mm in diameter) and allowing droplets of slurry to fall from the end of the tube into the bath. Alternatively, a vibrating rod may be used to from the droplets, e.g. by allowing a stream of the slurry to run down the rod as it vibrates.

Once the microspheres have been formed they can be removed from the bath and have no tendency to agglomerate since the polymer has been precipitated or coagulated to form a non-tacky solid. The spheres are then removed and dried.

DETAILED DESCRIPTION OF THE INVENTION

Figure 1:
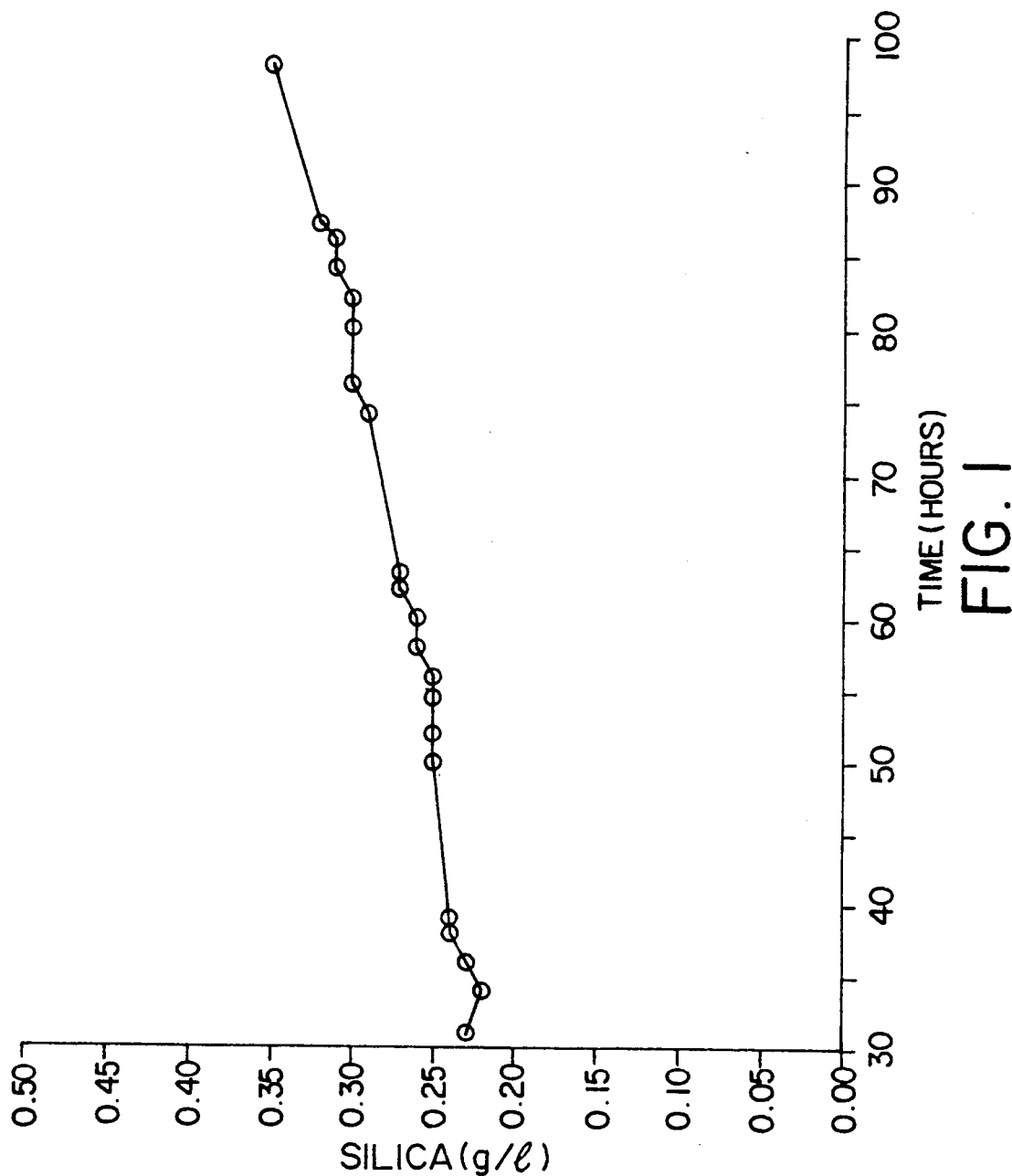
FIG. 1 is a plot of concentration of dissolved silica as a function of time.

For a better understanding of the present invention, some specific examples are given hereinbelow:

EXAMPLE 1

A synthetic desilication product, comprising mainly Bayer sodalite, was prepared by reacting Georgia kaolin with a sodium aluminate liquor of composition:

| | |
|---|---|
| Caustic, expressed as equivalent $Na_2CO_3$ | 192 g/L |
| Alumina | 65.3 g/L |

To 200 liters of aluminate liquor was added 14 kg of Georgia Kaolin and the slurry formed was placed in a pressure reactor and heated at 100° C. for 36 hours. At the end of the reaction time, the contents were cooled and the precipitated desilication product ranging in size from 8 to 50 microns was collected by filtering.

EXAMPLE 2

Pellets of synthetic desilication product made in Example 1 were prepared using polyvinylchloride as a binder. The polyvinylchloride was first dissolved in dimethylformamide (DMF), in the proportions 1 part by weight of polyvinylchloride (PVC) polymer in 10 parts by weight of DMF. Fifty (50) parts by weight of synthetic desilication product as prepared in Example 1 were slurried with 100 parts of the PVC/DMF solution. This slurry was pumped through a 2 mm diameter bore tubing, to produce a stream of individual drops at the rate of 40 drops per minute. These were allowed to fall from a height of 40 cm into a bath of 40% DMF in water. The water absorbed the DMF in the drops, producing solid spheres of desilication product bound by PVC. These spheres were separated from the bath, washed in water, and dried at 100° C. overnight.

The dried spheres were 3 to 5 mm in diameter, porosity as measured by a mercury porosimeter was 53.1%, and surface area as measured by the BET method was 17.2 square meters per gram.

EXAMPLE 3

About 1 kg of the above desilication product pellets were used in a column having a diameter of 5.3 cm and a height of 183 cm. A Bayer spent liquor containing 192.3 g/L caustic, 65.3 g/L $Al_2O_3$ and about 0.5 g/L $SiO_2$ was passed through the column at a temperature of about 90° C. This resulted in a reduction of $SiO_2$ in the liquor of from about 60% after 15 minutes contact time to 90% after 60 minutes contact time.

EXAMPLE 4

In this example three different types of desilication product containing material were agglomerated, and their effectiveness were compared. These were:

a. synthetic desilication product with polypropylene b. Jonquiere (QC) Plant Desilication Product scale with PVC c. Kirkvine (W.I.) Plant Desilication Product containing scale with PVC (a) Agglomerates of Synthetic Desilication Product with Polypropylene The synthetic sodalite made by the process described in Example 1 was used.

Agglomerates of this synthetic sodalite were made in Cowleshaw Rotating Mixer, Model AX-53-797, capacity 2 Imperial pints, manufactured by Cowleshaw Laboratory, England. This mixer is equipped with two Sigma type blades to provide the kneading and mixing action.

The solid polypropylene was placed in the mixer, and both the polymer and the mixer were heated to about 160° C. to melt the polymer. Five parts by weight of sodalite for each part by weight of the molten polypropylene were added to the mixer. After a few minutes of mixing, the mixture was allowed to solidify. The solids were broken manually into small irregularly shaped pieces about 1 to 5 mm in size, by hitting them with a hammer.

(b) Agglomerates made from Jonquiere (QC) Plant Desilication Product Scale

The Jonquiere (QC) Plant desilication product scale was shown by X ray diffraction analysis to consist of Cancrinite, $Na_6Ca_{1.5}Al_6Si_6O_{24}(CO_3)_{1.6}$, and/or Bayer sodalite $3(Na_2O.Al_2O_3.2SiO_2.2H_2O)Na_2X$, where X can be one of: $CO_3^=$, $SO_4^=$, $2Cl^-$, or $2AlO_2^-$; and/or Natrodavyne, low form, $3NaAlSiO_4.Na_2CO_3$.

This material was obtained from the piping transporting spent liquor in the Jonquiere (QC) Bayer plant processing Brazilian and African bauxites.

(c) Agglomerates made from Kirkvine (W.I.) Desilication Product Containing Scale The Kirkvine (W.I.) desilication product scale was shown by X ray diffraction analysis to consist of:

major constitutuent, more than 10% boehmite, AlOOH;

minor constituents, between 1 and 10%, of both Bayer sodalite and hematite, $Fe_2O_3$.

It was taken from the digesters at the Kirkvine Jamaica West Indies Bayer plant processing Jamaican bauxite.

Both the Vaudrueil and Kirkvine scale material was ground to −325 mesh. They were then formed into agglomerates with polyvinylchloride polymer by the process described in Example 2.

Testing Procedure and Results

The agglomerates were tested in a column for their suitability for removal of dissolved silica, by the same procedure described in Example 3. The composition of the spent liquor used in these tests was:

| | |
|---|---|
| Caustic, expressed as equivalent $Na_2CO_3$ | 190 g/L |
| Alumina | 57 g/L |

-continued

| Sodium Carbonate | 30 g/L |

It also contained dissolved $SiO_2$ at the concentration indicated in the table below.

The test was carried out at 90° C. The concentration of $SiO_2$ in the liquor exiting the column, compared with the entering concentration, is given in Table 2.

TABLE 2

| TYPE OF PELLETS | $SiO_2$ G/L IN TREATED LIQUOR | $SiO_2$ G/L IN ORIGINAL LIQUOR |
|---|---|---|
| Synthetic Desilication Product/Polypropylene | 0.23 | 0.51 |
| Jonquiere Desilication Product Scale/PVC | 0.24 | 0.57 |
| Kirkvine Plant Desilication Product Containing Scale/PVC | 0.37 | 0.57 |

The results show that the three types of desilication product containing pellets are equally effective for the removal of dissolved silica, whether made from synthetic desilication product, or desilication product made in a Bayer plant, or whether made with polyvinylchloride or polypropylene binder.

EXAMPLE 4

Pellets made with the PVC binder, as described in Example 2, were used in the column of Example 3 and spent liquor of the composition of Example 3 was passed through the column to remove the silica for a period of 100 hours. The results of these tests are shown in FIG. 1. It should be noted that the concentration of the dissolved silica in the feed was 0.46 g/L throughout the test. At the beginning of the test, the dissolved silica in the liquor leaving the column was 0.23 g/L. During the course of the test, while the concentration of dissolved silica in the exit liquor increased slowly and regularly, even after 100 hours of operation, the concentration had increased only to 0.35 g/L. This indicated that the pellets retained their effectiveness for removing dissolved silica for at least 100 hours.

The used pellets in the column were washed with hot water to remove the adhering sodium carbonate, and some of the desilication product, along with occluded Bayer process liquor. The washing is done inside the column, by backwashing with hot water heated to at least 50° C., preferably heated to 90° C. In one of the experimental runs, the pellets were subjected to ultra sonic vibrations during the washing step, this was found to increase the rate of removal of the adhering desilication product. The ultra sonic treatment can be applied to pellets that have been removed from the column, and washed batch wise in a separate tank.

Two volumes of hot water per volume of pellets were used. The wet pellets were dried by passing air through the column for a time sufficient to drive the water out of the void spaces in the pellets. After the washing the pellets were examined by Scanning Electron Microscopy (SEM).

Figure 2:
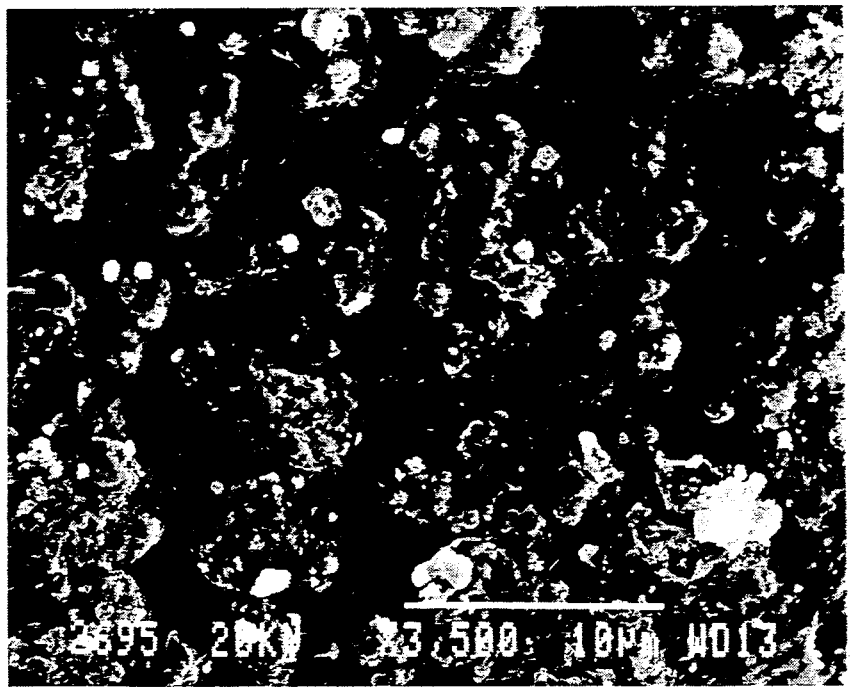
FIG. 2 is a photomicrograph of the exterior of new unused pellets.
Figure 3:
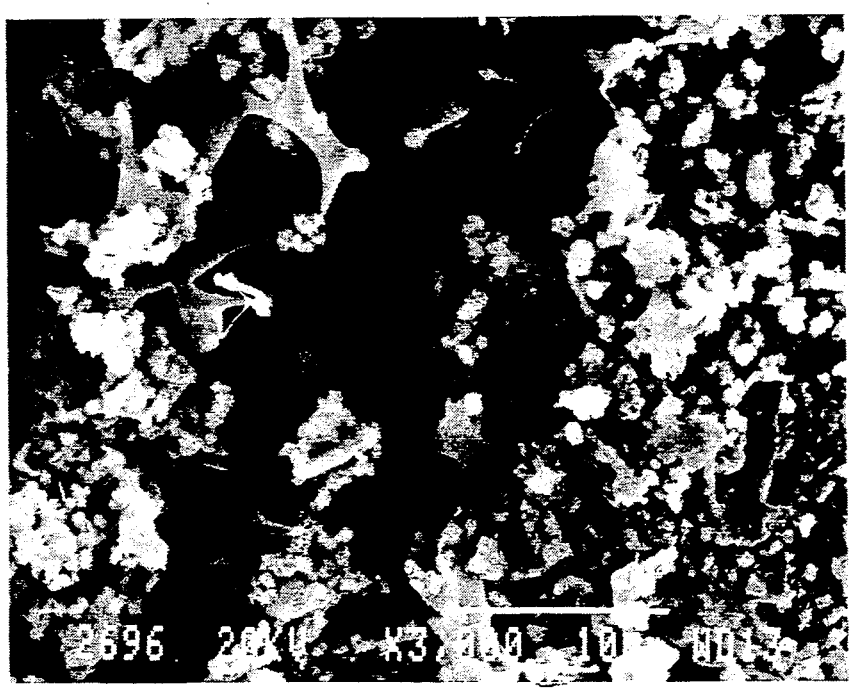
FIG. 3 is a photomicrograph showing the interior of the above pellets.
Figure 4:
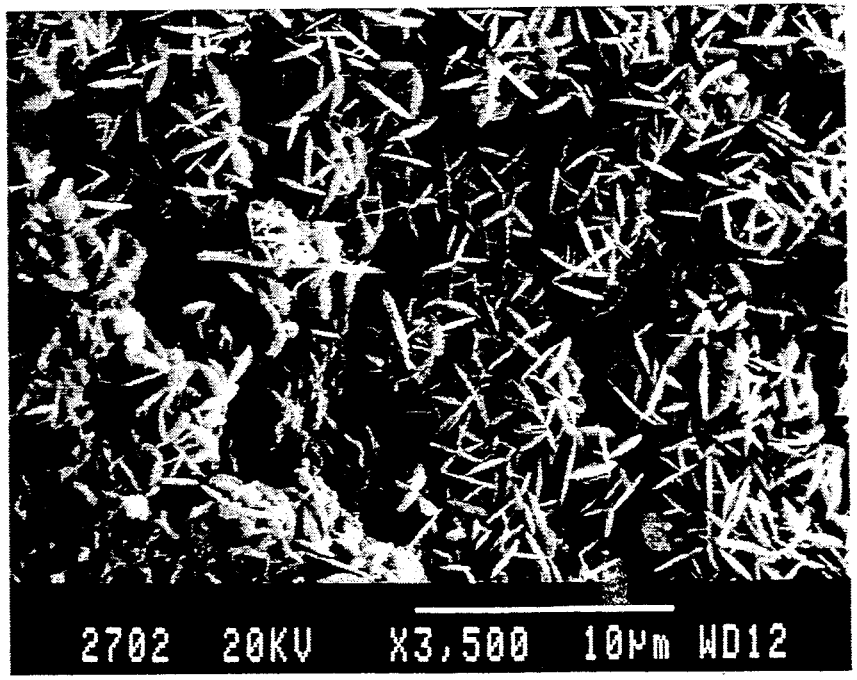
FIG. 4 is a photomicrograph showing the exterior of used pellets.
Figure 5:
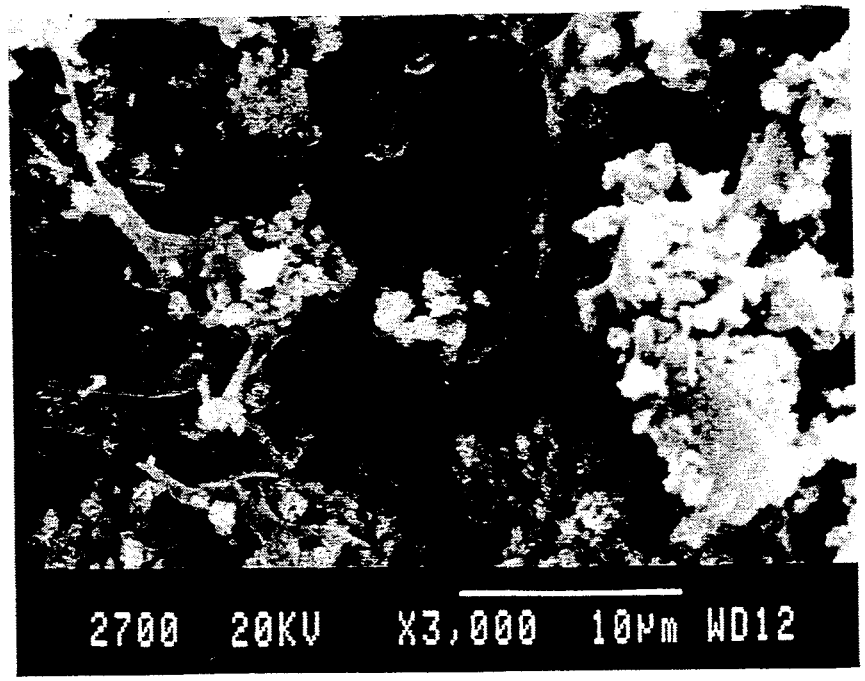
FIG. 5 is a photomicrograph showing the exterior of used pellets after being washed.
Figure 6:
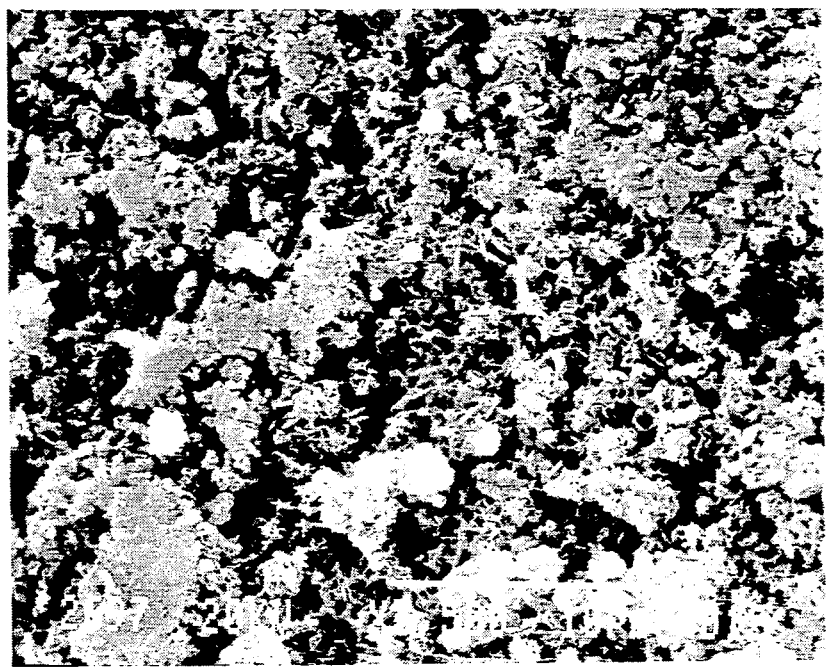
FIG. 6 is a photomicrograph showing the interior of used pellets.

The appearance under SEM of the new unused pellets is shown in FIG. 2 for the exterior, and in FIG. 3 for the interior of the pellets; the exterior of the used pellets before washing is shown in FIG. 4, the appearance of the used pellets after washing are shown in FIG. 5 for the exterior, and in FIG. 6 for the interior. Both the new and used pellets were quite porous, and consequently had a large surface area for the sodalite to precipitate on. The photos show that the exterior and the interior of the washed pellets were still covered with well crystallized deposits of new desilication product, which are very reactive seed surfaces and perform as such when recycled.

We claim:

1. A process for removing dissolved silica from a Bayer process solution or slurry which comprises: contacting the Bayer solution or slurry with porous agglomerates having a porosity of at least 40% and containing at least 10% by weight of Bayer process desilication product, in which desilication product-containing particles are bonded into agglomerates by a polymer resin which is resistant to chemical degradation by high concentrations of caustic present in Bayer process solution selected from the group consisting of polyvinylchloride and polypropylene.

2. A process according to claim 1, wherein the desilication product-containing agglomerates are in the form of pellets having a porosity of 40 to 65%.

3. A process according to claim 2, wherein the pellets have a surface area in the range of 15 to 30 $m^2/g$.

4. A process according to claim 3, wherein the pellets are contained in a column.

5. A process according to claim 1, wherein the desilication product comprises complex hydrated sodium aluminum silicates.

6. A process according to claim 1, wherein the desilication product comprises at least one compound selected from sodalite, cancrinite, noselite and natrodavyne.

7. A process according to claim 1 wherein a slurry of red mud in pregnant liquor is passed through a bed of said agglomerates in a pressurized column at a temperature above the boiling point of the liquor.

8. A process according to claim 1 wherein a slurry of red mud in pregnant liquor is contacted with a stirred mass of said agglomerates in a pressurized vessel at a temperature above the boiling point of the liquor.

9. A process according to claim 1 wherein pregnant liquor, with red mud removed, is passed through a bed of said agglomerates in a pressurized column at a temperature above the boiling point of the liquor.

10. A process according to claim 1 wherein pregnant liquor, with red mud removed, is contacted with a mass of said agglomerates in a pressurized vessel at a temperature above the boiling point of the liquor.

11. A process according to claim 1 wherein a slurry of red mud in pregnant liquor is passed at a temperature below the boiling point of the liquor through a bed of said agglomerates in a column open to the atmosphere.

12. A process according to claim 1 wherein a slurry of red mud in pregnant liquor is contacted at a temperature below the boiling point of the liquor with a stirred mass of said agglomerates in a vessel open to the atmosphere.

13. A process according to claim 1 wherein pregnant liquor, with red mud removed, is passed at a temperature below the boiling point of the liquor through a bed of said agglomerates in a column open to the atmosphere.

14. A process according to claim 1 wherein pregnant liquor, with red mud removed, is contacted at a temperature below the boiling point of the liquor with a stirred mass of said agglomerates in a vessel open to the atmosphere.

15. A process according to claim 1 wherein a spent liquor is passed through a column containing said agglomerates.

16. A process according to claim 1 wherein a spent liquor is contacted with a mass of said agglomerates in a vessel.

* * * * *